United States Patent [19]

Stubbings

[11] 4,120,181

[45] * Oct. 17, 1978

[54] LOCKING MECHANISM

[75] Inventor: James H. Stubbings, Rockville, Md.

[73] Assignee: Potomac Applied Mechanics, Inc., Bethesda, Md.

[*] Notice: The portion of the term of this patent subsequent to Nov. 22, 1994, has been disclaimed.

[21] Appl. No.: 796,823

[22] Filed: May 13, 1977

Related U.S. Application Data

[62] Division of Ser. No. 760,955, Jan. 21, 1977, Pat. No. 4,058,993.

[51] Int. Cl.² ............................................. E05B 65/52
[52] U.S. Cl. ........................................... 70/58; 70/63
[58] Field of Search ................... 70/14, 15, 57, 58, 91, 70/240, 241, 258, 63; 292/259, 300, 302, DIG. 9; 109/52; 211/4, 8; 248/203, 361

[56] References Cited

U.S. PATENT DOCUMENTS

| | | | |
|---|---|---|---|
| 1,573,579 | 2/1926 | Ross | 292/327 |
| 2,074,133 | 3/1937 | Rodin | 292/302 |
| 3,464,241 | 9/1969 | Wellekens | 70/91 |
| 4,058,993 | 11/1977 | Stubbings | 70/58 |

Primary Examiner—Robert L. Wolfe
Attorney, Agent, or Firm—Cushman, Darby & Cushman

[57] ABSTRACT

A locking mechanism for locking first and second relatively movable members together to prevent relative movement therebetween. A first set of spaced tubular members having aligned bores is mounted on the first member, and a second set of spaced tubular members having aligned bores is mounted on the second member. The tubular members of the second set are spaced apart in a manner to receive the first set therebetween with the bores of the first and second sets aligned. A removable hardened metal latching bolt having cross-sectional dimensions, generally corresponding in shape to the shape of the bores in the tubular members, is passed through such bores, and received by the tubular members to hold the first and second sets in alignment, A locking structure holds the latching bolt in place, the locking structure including a key-release lock, and a locking bolt extending generally perpendicular to the latching bolt and in interfering engagement therewith. The latching bolt is preferably completely contained by the tubular members so that no access to it form the exterior is provided. The locking mechanism is especially adapted for use in holding relatively movable walls of a metal box together.

14 Claims, 4 Drawing Figures

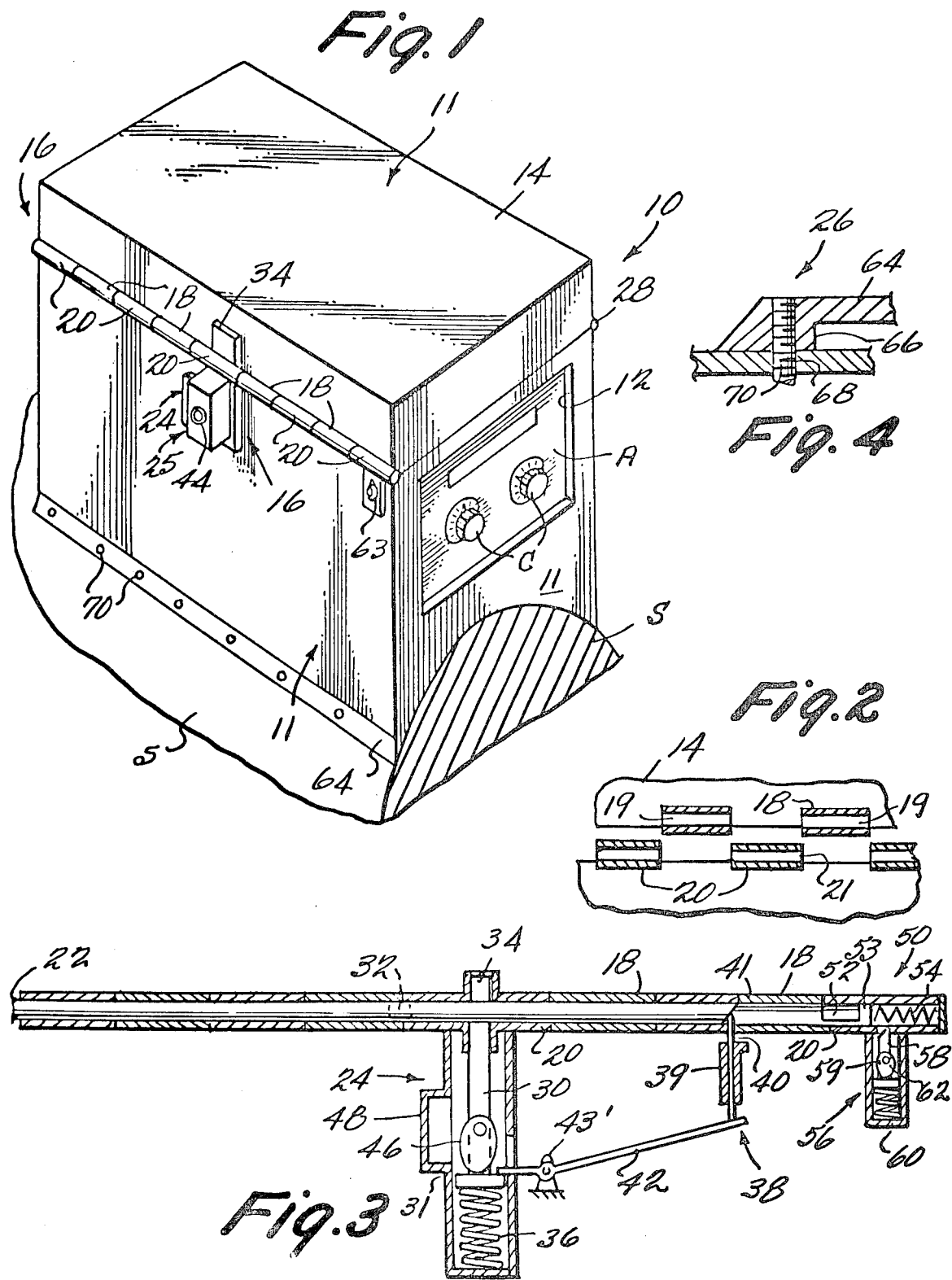

LOCKING MECHANISM

CROSS-REFERENCE TO RELATED APPLICATION

This application is a divisional of application Ser. No. 760,955 filed Jan. 21, 1977 and now U.S. Pat. No. 4,058,993 entitled "LOCK BOX".

BACKGROUND AND SUMMARY OF THE INVENTION

The invention relates to a locking mechanism for first and second relatively movable members, which may be used in a device for preventing theft of an appliance to be attached to a support surface, while still allowing access to controls for the appliance, and while allowing removal of the appliance by an authorized person.

According to the present invention, a locking mechanism is provided that is difficult to defeat. The container utilizing this locking mechanism may be made out of hardened metal or the like so that an object housed therein may be removed only if the support or the container is destroyed by a very sophisticated destruction device (i.e. as an acetylene torch), in which case there is also a large potential for the destruction of the contained object so as to make the object useless to the thief. It is assumed that a thief having sufficient sophistication to be able to destroy the container or the support would also realize that such destruction would result in the destruction of the contained object, and therefore it would not be worthwhile to attempt to steal it.

A theft-preventing container may be provided according to the invention, comprising a metal box for receipt of an object therein, the box having a plurality of walls one of which is movable to allow removal of an object within the box from the box. The locking mechanism according to the invention comprises a first plurality of space tubular members having aligned bores and extending from the movable wall, a second plurality of spaced tubular members having aligned bores and extending from a wall of the box distinct from the movable wall, the second plurality of tubular members being spaced apart in such a manner so that they receive the first plurality of spaced tubular members therebetween with bores of the first and second plurality of members aligned, a removable hardened metal latching bolt having cross-sectional dimensions generally corresponding in shape to the shape of the bores in the first and second plurality of spaced tubular members, the hardened metal latching bolt holding the first and second plurality of bores in alignment, and a locking means for holding the latching bolt in place received by the first and second plurality of tubular members to prevent relevant movement therebetween, said locking means including a key-release means. Additionally, means are provided for attaching the box to a stationary support, which support has a larger area than the box, so that the box may not be removed from the support from a location exterior of the box except by destruction of the box or the support. The invention is particularly adapted for the mounting of a citizens band radio within a motor vehicle, although many other applications are also contemplated including mounting of mobile phones, mounting of pay phones in telephone booths, mounting equipment in unlocked areas of offices, etc.

Preferably according to the present invention, the locking means comprises a locking bolt cooperable with an opening formed in the latching bolt, and spring means for biasing the locking bolt into engagement with the walls of the opening of the latching bolt. The key release means preferably comprises key operated means for moving the locking bolt against the bias of the spring means, such as an eccentric cam. The movable wall of the box can include a locking bolt receiving cavity for receiving the bolt when it extends completely through the opening and the latching bolt. Structure can also be provided for automatically locking the latching bolt in place when it is inserted properly into the bores within the tubular members. Such structure may comprise automatically releasable holding means for holding the locking bolt against the spring bias thereof in the first position, and for automatically releasing the locking bolt, under the influence of the bias spring thereof, in a second position in response to movement of the latching bolt so that it is completely received within the tubular members. Such automatically releasable holding means may comprise a lever for holding the locking bolt, a reciprocal cam for pivoting the lever out of holding relationship with the locking bolt, a cam portion formed on the latching bolt for reciprocally moving the cam rod, and spring means for biasing the lever into its first, holding position.

Additionally, since it is desirable to move the hardened latching bolt into receipt by the tubular member bores so that no portion thereof extends outwardly from the tubular members, ejector means desirably are provided for at least partially ejecting the latching bolt from receipt by the tubular members after unlocking of the key operated means. Such ejector means may comprise an ejector bolt and spring means for biasing the bolt to effect partial ejection of the latching bolt, and ejector bolt holding means, which ejector bolt holding means comprises a cam rod reciprocal by the ejector bolt, spring means for biasing the cam rod into engagement with a latching head portion of the ejector bolt, and manually operable means for moving the cam rod against the bias of the spring biasing means.

In many circumstances it will be feasible and desirable to mount the box to the support by passing conventional fastening means (i.e., rivets, screws, bolts) into the support from an interior portion of the box so that access to the fastening means from the exterior of the box is not possible. In such an event, the fastening means are essentially non-removable from the exterior of the box. In circumstances where such a mounting is not possible or desirable, however, the attaching means may still be made exteriorly non-removable according to the present invention. Exterior flange portions of the box which have threaded openings therein may be attached to the stationary support by prison screws or the like. During installation, the heads for such screws break off thereby leaving no tool engaging portion of the screws available to a would be thief, so that the box may not be removed from the support except by a destruction of the box or the support.

It is the primary purpose of the present invention to provide an improved versatile locking mechanism, especially one suited for containers. This and other objects of the invention will become clear from an inspection of the detailed description of the invention, and from the appended claims.

BRIEF DESCRIPTION OF THE DRAWINGS

FIG. 1 is a perspective view of a container utilizing an exemplary locking mechanism according to the present invention, the container being mounted in a motor vehicle with a citizens band radio contained therein;

FIG. 2 is a schematic view partly in section showing the tubular members for receipt of the latching bolt according to the present invention in movement toward operative relationship with each other:

FIG. 3 is a detailed view, partly in section and partly in elevation, showing exemplary locking, latching, and ejecting means according to the present invention; and FIG. 4 is a detailed cross-sectional view of exemplary non-removable attaching means utilizable with a container employing a locking mechanism according to the present invention.

DETAILED DESCRIPTION OF THE INVENTION

The container utilizing the locking mechanism according to the present invention comprises a metal box 10 for receipt of an object A or the like therewithin, a plurality of walls 11 of the box 10. At least one wall 11 may have an access opening 12 formed therein allowing access to controls C of an appliance A within the box 10, and one of the box walls (14) being movable to allow removal of the appliance A from within the box 10. A locking mechanism 16 according to the invention is provided for latching the movable box wall 14 to the rest of the box 10 to prevent unauthorized movement of said movable wall 14. The locking mechanism, or latching means 16 comprises a first plurality of spaced tubular members 18 having aligned bores 19, and extending from the movable wall 14, a second plurality of tubular members 20 having aligned bores 21 and extending from a wall 11 of the box 10 distinct from said movable wall 14, the second plurality of tubular members 20 being spaced apart in a manner to receive the first plurality of space tubular members 18 therebetween with bores 19, 21 aligned (see FIGS. 2 and 3); a removable hardened metal latching bolt 22 having cross-sectional dimensions generally corresponding in shape to the shape of the bores 19, 21 for maintaining the bores 19, 21 in alignment; and locking means 24 for holding the latching bolt 22 in place received by the first and second plurality of tubular members 18, 20 to prevent relative movement between the tubular members 18, 20, the locking means 24 including a key release means 25. Additionally, exteriorly non-removable means 26 are provided for attaching the box 10 to a stationary support S, the support S having a larger area than the box 10, so that the box 10 may not be removed from the support S except by a destruction of the box 10 or the support S.

The box 10 and the walls 11, 14 thereof may be made of any suitable metal, and the size of the box 10 relative to the size of the appliance A may be dimensioned so that the appliance either fits tightly within the box 10 (so that upon pounding destruction of the box 10 the appliance A is also destroyed) or so that the appliance A fits loosely within the box 10 (so that upon pounding and denting of the box walls 11 the appliance will not necessarily be destroyed). Preferably, the movable wall 14 is attached to one of the stationary walls 11 by a hinge 28, the hinge being provided of sturdy metal construction and preferably being disposed within the interior of the box 10, although it may be disposed on the exterior of the box assuming that the pin for the hinge and the tubular members for receipt of the hinge pin are of a construction as sturdy as that of the tubular members 18, 20 and the latching bolt 22. Of course other means of attachment of the movable wall to stationary wall members in addition to the latching means 16 may be provided (such as another latching means 16).

The latching bolt 22 preferably is of hardened steel, and it is so designed in length that it is completely received by the tubular members 18, 20, when inserted into locked latching position, no portions of the bolt 22 extending exteriorly of the members 18, 20. In this way, access to the bolt 22 may not readily be gained, and the bolt will be completely protected by the members 18, 20. Also, it is desired that the members 18, 20 be in close abutting relationship when the movable wall 14 is closed (i.e., see FIG. 3), again to prevent any access from the exterior to the bolt 22.

The locking means 24 for holding the latching bolt 22 in place, preferably comprises a locking bolt 30 disposed within a bolt chamber 31, and movable into interfering relationship with the latching bolt 22 by the bias of spring biasing means 36. An opening 32 may be provided within the bolt 22 for receipt of the locking bolt 30, and a locking bolt receiving cavity 34 may be provided for positive receipt of the locking bolt 30 after it passes through the opening 32. The chamber 31 and the cavity 34 are mounted on different walls of the box 10, one being mounted on the movable wall 14, and the other being mounted on a stationary wall 11 cooperating with the movable wall 14. Although either structure may be mounted on either wall, it is preferred that the chamber 31 be mounted on the stationary wall 11, and the cavity 34 on the movable wall 14.

It is desirable to provide structure for automatically locking the latching bolt 22 in place when it sufficiently penetrates the bores 19 and 21 and is received by the members 18, 20. Such structure may comprise automatically releasable holding means 38 which hold the locking bolt 30 against its spring bias out of interfering relationship with the latching bolt 22, until the latching bolt 22 has completely penetrated the bores 19, 21. Such means 38 preferably comprise a reciprocal cam rod 40, reciprocal within a guide 39 (which guide 39 may be mounted on the interior of the box 10), a cam face 41 formed on the penetrating end of the bolt 22, a lever 42 pivotal by the rod 40 to move out of holding relationship with the locking bolt 30, and a spiral spring 43 or the like for biasing the lever 42 so that it holds the locking bolt 30 against the bias of spring 36 out of interfering relationship with the bolt 22. The whole structure 38 may be mounted to the inside wall 11 having the tubular members 20 associated therewith, or it may be mounted to the exterior of that wall or in other ways to effect the desired end results. FIG. 3 is just a schematic showing of such means, and the shapes of various components thereof might have to be modified depending on the particular environment and particular dimension of the various components.

The key release means 25 may take a wide variety of forms, however it is preferred that a circular barrel lock cylinder 44 be provided for receipt of a circular barrel key, a rotatable portion of the lock cylinder 44 being attached to eccentric cam 46 or the like. Upon insertion of the key into cylinder 44, the cam 46 may be rotated from the position shown in FIG. 3 (wherein it holds the locking bolt 30 out of interfering relationship with the latching bolt 22 against the bias of spring 36) into the cam receiving housing portion 48 of chamber 31 (so that the locking bolt 30 may move under the bias of spring 36 into interfering engagement with the latching bolt 22 upon release of holding means 38).

Since it will normally be desirable to dimension the latching bolt 22 and the tubular members 18, 20, so that the bolt 22 is completely received thereby in locked latching position, some mechanism is desirably provided for ejecting the bolt 22 from receipt by the members 18, 20, when it is desired to remove the bolt 22 and move the wall 14. Such latching bolt ejector means 50 may comprise an ejector bolt 52 mounted for reciprocation within a tubular member 20 (extendable into the adjacent tubular member 18) having a head portion 53 thereof, and spring biasing means 54 for biasing the ejector bolt 52 to eject the bolt 22. Preferably, the bolt 52 is so dimensioned so that it can be completely received within the end tubular member 20 upon compression of the spring 54. Releasable ejectable holding means 56 are provided for releasing the bolt 52 to move under the bias of spring 54 and eject the bolt 22. Such means 56 preferably comprise a reciprocal cam rod 58 movable in a housing 59, a spring 60 for biasing the rod 58 into engagement with a latching portion (i.e., head 53) of the bolt 52, and an eccentric cam 62 or the like for holding the rod 58 out of interfering relationship with the bolt 52 (as in FIG. 3). The cam 62 is manually movable as by a knob 63, and if desired a key-release means can be provided for operation of the cam 62 (such as a combination lock, or a barrel lock cylinder like the cylinder 44, etc.).

The box 10 is attached to the support S so that the box 10 may not be removed from the support S except by destruction of the box of the support. Such attaching means could include conventional attaching members such as rivets, bolts, or screws that were passed through the inside of the box to and into the support so that no access to such fastening means could be gained from the exterior of the box, or alternatively non-removable means exterior of the box 10 could be provided. The means 26 for attaching the box 10 to the support S so that the box 10 may not be removed from the support S from a location exterior of the box 10 except by destruction of the box or the support, preferably includes a plurality of flanges 64 each having a plurality of depending threaded portions 66 associated therewith for cooperation with a corresponding plurality of threaded openings 68 provided in the support S. A prison screw 70 is disposed in each threaded portions 66 and corresponding opening 68. Prison screws conventionally comprise a threaded shank member that is attached to the head by a frangible coupling, so that upon threading of the shank into the desired position, the head may be removed by applying a force thereto, so that no tool engaging portion upstands from the screw shank so that the removal of the screw shank from threaded engagement with its cooperating openings is difficult—if not impossible— without complete destruction of the surrounding portions.

The object A to be housed by the box 10 may comprise any of a wide variety of objects, and the support S can also comprise a wide variety of structures. It is believed that the present invention is particularly adapted for use in mounting a citizens band radio in a motor vehicle interior. In the schematic showing of FIG. 1, the support S is the power train hump in an automobile, the box straddling the hump and the CB radio A disposed within the hump with the controls therefor accessible through opening 12 (although it is not shown, the microphone wire can also extend through the opening 12, and a mount can be provided on the front of the box 10 for supporting the microphone when not in use).

The structure according to the present invention having been described, an exemplary method of utilization thereof will now be set forth:

A box 10 is disposed over the drive train hump S in an automobile, with the flanges 64 abutting portions of the support S, and a prison screw 70 is threaded through each opening in the flange 64 into the threaded opening 68 provided in the support S, and the heads of the prison screws are broken off. A CB radio A or the like is then disposed within the box 10, and the movable wall 14 thereof is pivoted about hinge 28 until the tubular members 18 of the movable wall 14 are in operative relationship with the tubular members 20 disposed on the stationary wall 11 of the box 10. The bores 19, 21 will be aligned in this position. Using a barrel key or the like, and inserting it in the locked cylinder 44, the cam 46 is rotated so that it extends into the housing portion 48, the locking bolt 30 being held against the spring bias thereof by the lever 42. The latching bolt 22 is then inserted into the bores 19, 21, completely penetrating the bores until no portion of the bolt 22 extends outwardly from the end most tubular member. During movement through the bores 19, 21, the cam face 41 of bolt 22 will depress cam rod 40, which in turn will pivot lever 42 against the bias of spring 43 out of holding relationship with the locking bolt 30, and the bolt 30 will move into locking engagement with the bolt 22 as soon as the opening 32 of bolt 22 is disposed in alignment with the bolt and receiving cavity 34. Simultaneously with the depression of rod 40, ejector bolt 52 will be reciprocated against the bias of spring 54.

The ejector bolt 52 and spring 54 are designed so that the bolt 52 does not interfere with the movement of a tubular member 18. The bolt 52 may be held in its depressed position by manual operation of knob 63 to free the reciprocal cam rod 58 to act under the bias of spring 60 and hold the head 53 of the bolt 52 against the bias of spring 54.

When the movable wall 14 is locked in place, no access is provided to the appliance A except through the access opening 12.

When it is desired to remove the appliance A from the box 10 by an authorized individual, a key is inserted in barrel lock 44 and cam 46 is rotated to move the locking bolt 30 against the bias of spring 36 into the position shown in FIG. 3, thereby moving the bolt 30 out of interfering relationship with the latching bolt 22. This will automatically reset the holding lever 42, the lever 42 returning to the position shown in FIG. 3 under the bias of spring 43 once the influence of camming face 41 and rod 40 is terminated. Then, the knob 63 is operated to rotate the cam 62 to the position shown in FIG. 3, depressing the rod 58 against the bias of spring 60 to thereby release the ejector bolt 52. The ejector bolt 52 then is free to move under the influence of spring 54 to at least partially eject the latching bolt 22 from receipt by the bores 19, 21, so that the operator may grab a portion of the bolt 22 and remove it from the bores 19, 21. The movable wall 14 may then be pivoted to open position to allow removal of the appliance A.

It is believed that the locking mechanism according to the present invention will be a simple, effective structure, the invention providing a locking mechanism that is extremely difficult to defeat. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A locking mechanism for first and second relative movable members comprising
   (a) a first plurality of spaced tubular members having aligned bores and extending from said first movable member,
   (b) a second plurality of spaced tubular members having aligned bores and extending from said second movable member, said second plurality of tubular members being spaced apart in a manner to receive said first plurality of spaced tubular member therebetween with bores of said first and second plurality of members aligned,
   (c) a removable hardened metal latching bolt having cross-sectional dimensions generally corresponding in shape to the shape of said bores in said first and second plurality of spaced tubular members for receipt thereby to hold said first and second plurality of bores in alignment, and
   (d) a locking means for holding said latching bolt in place received by said first and second plurality of tubular members to prevent relative movement between said tubular members, said locking means including a key-release means; and said locking means, including said key-release means, being mounted exterior of said latching bolt.

2. A mechanism as recited in claim 1 wherein said locking means comprises a locking bolt, an opening in said latching bolt for receiving said locking bolt, and spring means for biasing said locking bolt into engagement with the walls of said opening in said latching bolt, and wherein said key-release means comprises key-operated means for moving said locking bolt against the bias of said spring means.

3. A mechanism as recited in claim 2 wherein said first member includes a locking bolt receiving cavity for receiving said locking bolt when said locking bolt extends completely through said opening in said latching bolt.

4. A mechanism as recited in claim 1 further comprising latching bolt ejector means for at least partially ejecting said latching bolt from receipt by said first and second pluralities of tubular members, said ejector means comprising an ejector bolt and spring means for biasing said ejector bolt to effect partial ejection of said latching bolt.

5. A mechanism as recited in claim 1 wherein said first and second relatively movable members comprise walls of a container.

6. A mechanism as recited in claim 5 wherein said container comprises a metal box, and wherein one of said members comprises a relatively movable wall of said metal box.

7. A mechanism as recited in claim 6 further comprising means for attaching said box to a stationary support having a larger area than said box, so that said box may not be removed from said support from a location exterior of said box except by destruction of said box or said support.

8. A mechanism as recited in claim 7 wherein said attaching means comprises a flange portion of said metal box having a plurality of threaded openings therein, a plurality of prison screws, one received by each of said threaded openings, and a plurality of threaded openings in said support for receipt of said prison screws.

9. A mechanism as recited in claim 6 wherein said movable wall is pivotally mounted to a wall of said box distinct from said movable wall, and is pivotally movable into cooperation with said second plurality of spaced tubular members on another of said box walls.

10. A mechanism as recited in claim 9 wherein said locking means comprises a locking bolt spring-biased into interfering relationship with said latching bolt.

11. A mechanism as recited in claim 1 wherein said key-release means comprises a barrel locking cylinder and an eccentric cam, said eccentric cam engaging a locking bolt of said locking means for movement thereof out of interfering relationship with said latching bolt.

12. A locking mechanism for first and second relative movable members comprising
   (a) a first plurality of spaced tubular members having aligned bores and extending from said first movable member,
   (b) a second plurality of spaced tubular members having aligned bores and extending from said second movable member, said second plurality of tubular members being space apart in a manner to receive said first plurality of spaced tubular member therebetween with bores of said first and second plurality of members aligned,
   (c) a removable hardened metal latching bolt having cross-sectional dimensions generally corresponding in shape to the shape of said bores in said first and second plurality of spaced tubular members for receipt thereby to hold said first and second plurality of bores in alignment,
   (d) a locking means for holding said latching bolt in place received by said first and second plurality of tubular members to prevent relative movement between said tubular members, said locking means including a key-release means, and
   (e) latching bolt ejector means for at least partially ejecting said latching bolt from receipt by said first and second pluralities of tubular members, said ejector means comprising an ejector bolt and spring means for biasing said ejector bolt to effect partial ejection of said latching bolt.

13. A mechanism as recited in claim 12 wherein said latching bolt is completely contained by said first and second pluralities of tubular members when locking said first and second members together.

14. A mechanism as recited in claim 12 wherein said latching bolt ejector means further comprises ejector bolt holding means, said ejector bolt holding means comprising a cam rod reciprocal by said ejector bolt, spring means for biasing said cam rod into engagement with a latching portion of said ejector bolt, and manually operable means for moving said cam rod against the bias of its spring biasing means.

* * * * *